United States Patent
Fukumaru et al.

(10) Patent No.: US 12,326,458 B2
(45) Date of Patent: Jun. 10, 2025

(54) METHOD OF PRODUCING SAMPLE COLLECTION APPARATUS

(71) Applicant: ARKRAY, Inc., Kyoto (JP)

(72) Inventors: Hajime Fukumaru, Kyoto (JP); Suguru Yoshida, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 276 days.

(21) Appl. No.: 18/126,771

(22) Filed: Mar. 27, 2023

(65) Prior Publication Data
US 2023/0314460 A1    Oct. 5, 2023

(30) Foreign Application Priority Data

Apr. 4, 2022   (JP) .................................. 2022-062651

(51) Int. Cl.
*G01N 35/10* (2006.01)
*B01L 3/00* (2006.01)

(52) U.S. Cl.
CPC ............ *G01N 35/1011* (2013.01); *B01L 3/56* (2013.01)

(58) Field of Classification Search
CPC ......... G01N 35/1011; G01N 35/00693; G01N 35/1083; B01L 3/56
See application file for complete search history.

(56) References Cited

U.S. PATENT DOCUMENTS

| | | |
|---|---|---|
| 2005/0194394 A1 | 9/2005 | Ueda et al. |
| 2009/0078717 A1 | 3/2009 | Kowari et al. |
| 2011/0174708 A1 | 7/2011 | Oota et al. |

FOREIGN PATENT DOCUMENTS

| | | |
|---|---|---|
| JP | 2015-127700 A | 7/2015 |
| WO | 2010/038852 A1 | 4/2010 |

OTHER PUBLICATIONS

Extended European Search Report dated Aug. 8, 2023, issued in corresponding European Patent Application No. 23165135.7.

*Primary Examiner* — Kathryn Elizabeth Limbaugh
(74) *Attorney, Agent, or Firm* — Morgan, Lewis & Bockius LLP

(57) ABSTRACT

A method of producing a sample collection apparatus, including steps of: attaching a holding member to a support of a nozzle unit such that, in slits provided with N edges (N≥3), a collection range w of a sample tube is included within a range from a lower-limit position at a distance w/2 from a 1st edge toward an initial-position, to an upper-limit position at a distance w/2 from an Nth edge away from the initial position; loading the sample tube on the holding member; counting the number of pulses with which a pulse motor is driven to move a nozzle to the center of the collection range; identifying the signal corresponding to the last edge recognized by a photo-interrupter before the nozzle reaches the center of the collection range; and storing the number of pulses and the signal corresponding to the last edge in a storage device.

6 Claims, 13 Drawing Sheets

METHOD OF PRODUCING SAMPLE COLLECTION APPARATUS

CROSS-REFERENCE TO RELATED APPLICATION

This application claims priority under 35 USC 119 from Japanese Patent Application No. 2022-062651, filed on Apr. 4, 2022, the disclosure of which is incorporated by reference herein.

BACKGROUND

Technical Field

The present invention relates to a method of producing a sample collection apparatus for collecting a sample such as a blood sample from a sample tube, and subjecting the sample to various analyses.

Related Art

For a liquid chromatography apparatus for collecting a sample such as a blood sample from a sample tube and subjecting the sample to analysis, techniques such as that in Japanese Patent Application Laid-Open (JP-A) No. 2015-127700 in which a blood sample is collected from a blood collection tube placed on a rack using a nozzle movable in the vertical direction and horizontal direction have been disclosed. Further, techniques such as that in WO 2010/038852 A1 in which a blood collection tube is held in a state in which the tube is sandwiched between a driving roller and a driven roller, wherein, in this state, a nozzle breaks through a cap to enter the blood collection tube, and sucks blood to be subjected to liquid chromatography, have been disclosed.

In apparatuses such as in the technique described in WO 2010/038852 A1 in which a liquid sample such as blood is sucked using a nozzle in a state in which a sample tube containing the sample is held by rollers, a pulse motor is used in some cases to drive the nozzle to move to a predetermined position of the sample tube. In cases in which such a mechanism of nozzle movement using a pulse motor does not normally operate, in other words, in cases in which, for example, the nozzle does not reach the intended position, it may be attributable to the pulse motor being out of step. Examples of the cause of this include design problems such as high working speed and insufficient torque of the pulse motor; and accidental causes such as collision with an obstacle during the operation.

In order to allow the apparatus using the mechanism to normally operate, it may be necessary in some cases to confirm whether the nozzle has reached the position intended by the mechanism. An ordinary method used for detecting normal operation of the mechanism is a method in which an optical sensor or the like is used to compare, with a predetermined reference value, how many slits have been detected during the operation of the motor or how many pulses have been input into the pulse motor to achieve slit-to-slit movement. The reference value is calculated based on the working distance, the excitation method for the motor, the width of the slit, and/or the like of the mechanism, and stored as setting information for the apparatus during its production.

A conventional reference value is a value uniquely defined based on the design (such as the number of pulses input into the pulse motor). This value is set taking variation into account such that a difference from the set reference value attributable to variation among mechanisms due to the tolerance, vibration during the operation of the mechanism, and the like is acceptable. Therefore, the accuracy of the judgment may be lower than the original accuracy. In order to take the variation into account while maintaining the accuracy, adjustment of the reference value and the sensor position is necessary for each mechanism, so that the production and the installation of the apparatus require more manpower.

In view of this, an aspect of the invention provides a technique that enables production of a sample collection apparatus capable of securely moving a nozzle to a predetermined position of a sample tube, without requiring manpower during the production and the installation of the apparatus.

SUMMARY

An aspect of the disclosure is a method of producing a sample collection apparatus, the apparatus including:
  a support provided with a pulse motor, and with a nozzle unit that is driven by the pulse motor to cause horizontal movement of a nozzle from an initial position to a sample collection position;
  a slit plate which functions as a guide for the movement of the nozzle unit and in which slits provided with N continuous edges, wherein N is an integer of 3 or higher, are formed;
  a photo-interrupter that moves in conjunction with the nozzle unit to recognize the slits;
  a holding member configured to hold, under the sample collection position, a sample tube which stores a sample, and in which an insertion opening for insertion of the nozzle is formed;
  a controller configured to control the pulse motor and the photo-interrupter; and
  a storage device for storing data for carrying out control;
wherein in a case in which
  a diameter of a collection range that is a range in which the nozzle can be inserted into the insertion opening is defined as w,
  an edge closest to the initial position among the N continuous edges is defined as a 1st edge, and an edge most distant from the initial position is defined as an Nth edge,
  signals sent to the controller in a case in which the photo-interrupter recognizes the 1st edge to the Nth edge are defined as a 1st signal to an Nth signal, respectively,
  positions of the nozzle at which the photo-interrupter recognizes the 1st edge to the Nth edge are defined as a 1st position to an Nth position, respectively,
  all distances between positions next to each other among the 1st position to the Nth position are less than $w/2$,
  a position at a distance of $w/2$ from the 1st position toward an initial-position side is defined as a lower-limit position, and
  a position at a distance of $w/2$ from the Nth position toward a side opposite from the initial position is defined as an upper-limit position,
the method includes the steps of:
  attaching the holding member to the support such that the collection range is included within a range from the lower-limit position to the upper-limit position;
  loading the sample tube on the holding member;

counting a number of pulses with which the pulse motor is driven to move the nozzle to a center of the collection range of the sample tube;

identifying, among the 1st signal to the Nth signal, a last signal recognized by the photo-interrupter before the nozzle reaches the center of the collection range; and storing the number of pulses and the last signal in the storage device.

Because of the above configuration of the aspect of the disclosure, a sample collection apparatus capable of securely moving a nozzle to a predetermined position of a sample tube can be produced without requiring manpower during the production and the installation of the apparatus.

BRIEF DESCRIPTION OF THE DRAWINGS

Exemplary embodiments will be described in detail based on the following figures, wherein.

DETAILED DESCRIPTION

Figure 1:
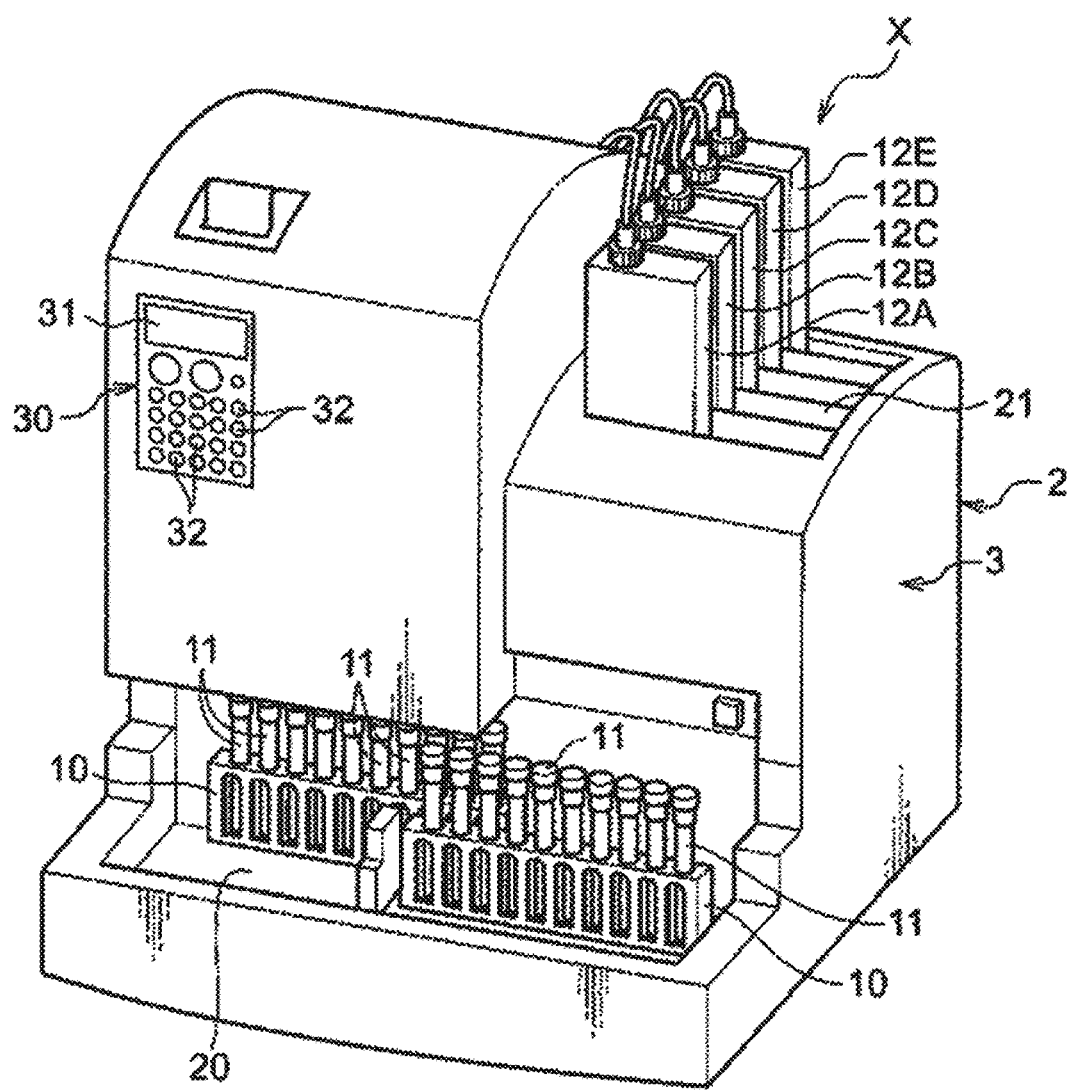
FIG. 1 is a front perspective view of the external appearance of an HPLC apparatus.

The sample collection apparatus produced by the production method of a first embodiment of the disclosure includes:

a support provided with a pulse motor, and with a nozzle unit that is driven by the pulse motor to cause horizontal movement of a nozzle from an initial position to a sample collection position;

a slit plate which functions as a guide for the movement of the nozzle unit and in which slits provided with N continuous edges, wherein N is an integer of 3 or higher, are formed;

a photo-interrupter that moves in conjunction with the nozzle unit to recognize the slits;

a holding member configured to hold, under the sample collection position, a sample tube which stores a sample, and in which an insertion opening for insertion of the nozzle is formed;

a controller configured to control the pulse motor and the photo-interrupter; and a storage device for storing data for carrying out the control.

The controller drives the pulse motor to move the nozzle unit from the initial position to the sample collection position. During the movement, the photo-interrupter recognizes the slits, and the recognized information is sent to the controller. The sent information is compared with the data stored in the storage device, and the controller controls the movement of the nozzle unit. This process is described later.

In this process, the diameter of the collection range that is the range in which the nozzle can be inserted into the insertion opening for insertion of the nozzle in the sample tube is defined as w. An edge closest to the initial position among the N continuous edges in the slits is defined as a 1st edge, and an edge most distant from the initial position is defined as an Nth edge. Signals sent to the controller in a case in which the photo-interrupter recognizes the 1st edge to the Nth edge are defined as a 1st signal to an Nth signal, respectively. Positions of the nozzle at which the photo-interrupter recognizes the 1st edge to the Nth edge are defined as a 1st position to an Nth position, respectively. All distances between positions next to each other among the 1st position to the Nth position are less than $w/2$. The position at a distance of $w/2$ from the 1st position toward an initial-position side is a lower-limit position, and the position at a distance of $w/2$ from the Nth position toward a side opposite from the initial position is an upper-limit position. Thus, the distance from the lower-limit position to the upper-limit position is less than $(w+w\cdot(N-1)/2)$.

Then, a step of attaching the holding member to the support such that the collection range is included within the range from the lower-limit position to the upper-limit position is carried out. In other words, the holding member is attached to a position where the collection range of the sample tube covers neither the lower-limit position nor the upper-limit position. Subsequently, a step of loading the sample tube on the holding member is carried out. Subsequently, a step of counting a number of pulses with which the pulse motor is driven to move the nozzle to a center of the collection range of the sample tube is carried out. Subsequently, a step of identifying, among the 1st signal to the Nth signal, the last signal recognized by the photo-interrupter before the nozzle reaches the center of the collection range is carried out. Finally, a step of storing the counted number of pulses and the identified last signal in the storage device is carried out to thereby complete the production of the sample collection apparatus.

The sample collection apparatus produced by the production method of the present embodiment can be operated as follows. In the following description, the 1st signal to the Nth signal are collectively referred to as "edge signals". First, after the sample tube is loaded on the holding member, the controller drives the pulse motor to move the nozzle unit. At the time when the pulse motor is driven for a number of pulses (hereinafter referred to as "predetermined pulse number") stored in the storage device, the drive of the pulse motor is stopped to stop the nozzle unit. During the movement of the nozzle unit, the photo-interrupter recognizes the edge signals, and the last signal recognized before the stopping of the nozzle unit is sent to the controller. The controller judges whether the received last signal is the same as the last signal stored in the storage device (hereinafter referred to as "reference signal"). In cases in which these signals are the same, the nozzle unit is judged to be at the correct sample collection position, and the nozzle is lowered to collect the sample. However, in cases in which the signals are not the same, for example, in cases in which only the edge signals before the reference signal are recognized, or where the edge signal subsequent to the reference signal is recognized, the nozzle unit is judged not to be at the correct sample collection position, and the nozzle is not lowered. In such cases, a predetermined error message may be displayed.

Here, the lower-limit position is at a distance of w/2 from the 1st position toward the initial-position side; the upper-limit position is at a distance of w/2 from the Nth position toward the side opposite from the initial position; and the collection range covers neither the lower-limit position nor the upper-limit position. Therefore, at the time point when the pulse motor is driven for the predetermined pulse number, the photo-interrupter is expected to have recognized at least the 1st edge, but not to have recognized the Nth edge. Thus, at the time point when the pulse motor has been driven for the predetermined pulse number, in cases in which the 1st edge has not been recognized by the photo-interrupter, or in cases in which the Nth edge has been recognized, it can be assumed that there is a certain problem in at least one of the pulse motor or the driving system of the nozzle unit. Further, at the time point when the pulse motor has been driven for the predetermined pulse number, in cases in which the edge corresponding to the reference signal has not been recognized by the photo-interrupter, or in cases in which the edge subsequent to the edge corresponding to the reference signal has been recognized by the photo-interrupter, it can be assumed that there is a certain problem in at least one of the pulse motor or the driving system of the nozzle unit. In cases in which occurrence of such a problem is assumed, the nozzle unit is judged not to be at the correct sample collection position, and the nozzle is not lowered.

According to the production method of the embodiment, by attaching the holding member to the support such that the holding member is attached within the range from the lower-limit position to the upper-limit position, the insertion of the nozzle in the vicinity of the center of the collection range can be easily realized in the sample collection apparatus.

Regarding the edges formed by the slits in the slit plate, at least three continuous edges may be formed. Thus, the sample collection apparatus produced by the production method of the second embodiment of the disclosure is provided with at least three continuous edges in the slit plate in the sample collection apparatus in the first embodiment. The three continuous edges are defined, from the side closer to the initial position, as a 1st edge, a 2nd edge, and a 3rd edge. The signals sent to the controller in a case in which the photo-interrupter recognizes the 1st edge, the 2nd edge, and the 3rd edge are defined as a 1st signal, a 2nd signal, and a 3rd signal, respectively. The positions of the nozzle at which the photo-interrupter recognizes the 1st edge, the 2nd edge, and the 3rd edge are defined as a 1st position, a 2nd position, and a 3rd position, respectively. The distance a from the 1st position to the 2nd position is less than w/2, and the distance b from the 2nd position to the 3rd position is less than w/2. The position at a distance of w/2 from the 1st position toward the initial-position side is a lower-limit position, and the position at a distance of w/2 from the 3rd position toward the side opposite from the initial position is an upper-limit position. Thus, the distance from the lower-limit position to the upper-limit position is less than 2w.

Then, a step of attaching the holding member to the support such that the collection range is included within the range from the lower-limit position to the upper-limit position is carried out. In other words, the holding member is attached to a position where the collection range of the sample tube covers neither the lower-limit position nor the upper-limit position. Subsequently, a step of loading the sample tube on the holding member is carried out. Subsequently, a step of counting the number of pulses with which the pulse motor is driven to move the nozzle to the center of the collection range of the sample tube is carried out. Subsequently, a step of identifying, among the 1st signal, the 2nd signal, and the 3rd signal, the last signal recognized by the photo-interrupter before the nozzle reaches the center of the collection range is carried out. Finally, a step of storing the counted number of pulses and the identified last signal in the storage device is carried out to thereby complete the production of the sample collection apparatus.

The operation of the sample collection apparatus produced by the production method of this embodiment is the same as in the first embodiment.

The first embodiment is described below with reference to drawings. The same symbols in the drawings represent identical components even when they are not specifically mentioned in the descriptions of the drawings.

Figure 2:
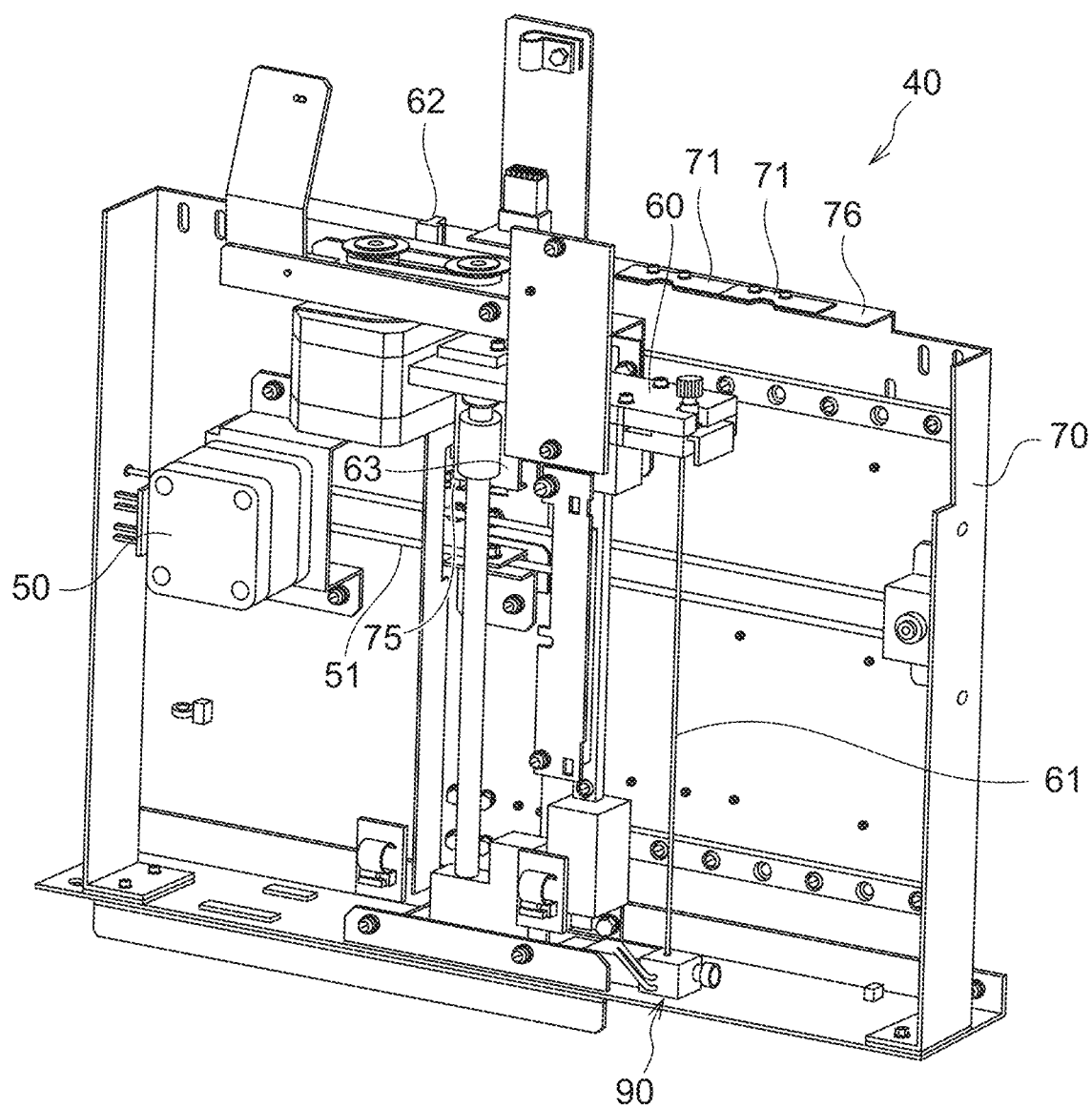
FIG. 2 is a front perspective view of the external appearance of a sample collection apparatus.

FIG. 1 is a front perspective view of the external appearance of an HPLC apparatus X utilizing high-performance liquid chromatography (HPLC) provided with a sample collection apparatus 40 of the first embodiment (see FIG. 2).

The HPLC apparatus X is configured such that sample tubes 11 held in racks 10 are placed on a table 20, and such that the glycohemoglobin (HbA1c) level in whole blood is automatically measured. The HPLC apparatus X includes a plurality of eluent bottles 12A, 12B, 12C, 12D, and 12E (five bottles, in FIG. 1), and an apparatus body 2.

The eluent bottles 12 A to 12 E retain eluents A to E that are to be supplied to an analysis column not shown in the drawing, and the eluent bottles are placed in a holder section 21 in the apparatus body 2. The eluents have different compositions, component ratios, pHs, osmotic pressures, and the like depending on their intended uses.

The table 20 is configured such that the racks 10 placed in predetermined positions are moved so as to move the sample tubes 11 held in the racks 10 to a position where collection is possible by a nozzle 61 of a nozzle unit 60 described below.

A housing 3 is provided with an operation panel 30 and a display panel 31. In the operation panel 30, a plurality of operation buttons 32 are provided. Operation of the operation buttons 32 enables generation of signals for carrying out various operations (such as analysis operations and printing operations), or enables various types of setting (such as setting of analysis conditions and input of an ID of a subject). The display panel 31 is for displaying analysis results and occurrence of errors, and for displaying an operation procedure, operation conditions, and the like during the setting.

Figure 3:
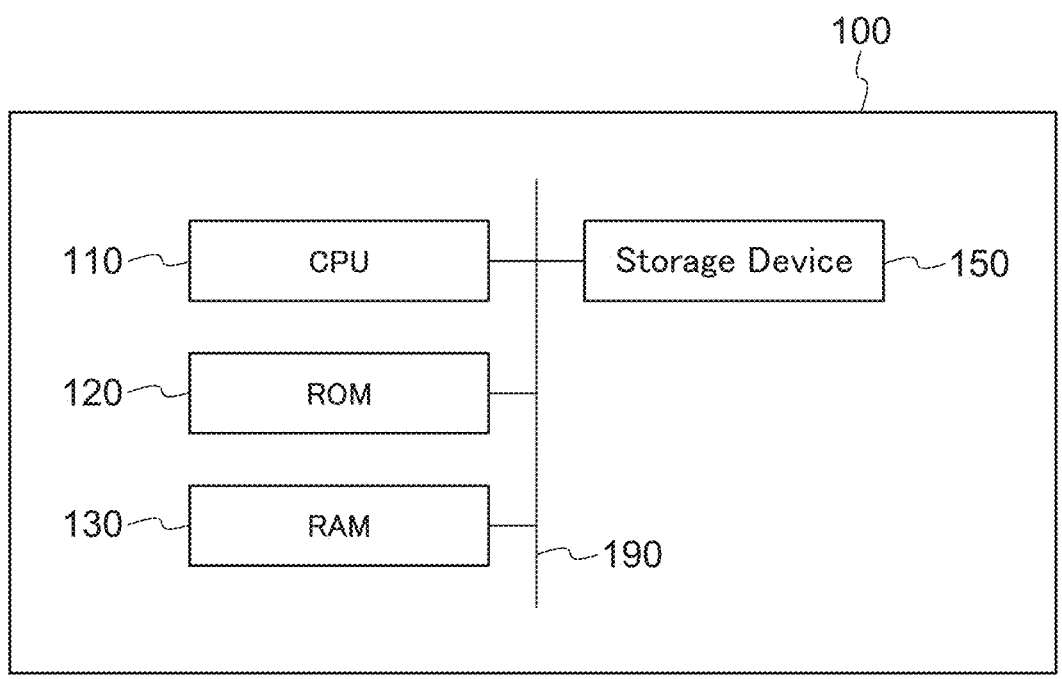
FIG. 3 is a block diagram illustrating the hardware configuration of a controller in a sample collection apparatus.

FIG. 2 is a front perspective view of part of the sample collection apparatus 40 included in the HPLC apparatus X of FIG. 1. Further, FIG. 3 is a block diagram illustrating a hardware configuration of a controller 100 constituting a part of the sample collection apparatus 40.

A support 70 having a plate-like shape vertically placed in an upright position is provided with a pulse motor 50. The pulse motor 50 rotates a drive belt 51 fitted in a left-right direction, to move the nozzle unit 60 attached to the drive belt 51 together with the nozzle 61, in the left-right direction (i.e., a horizontal direction).

A slit plate 71 is attached to a top plate 76 constituting a top side of the support 70. Further, the nozzle 61 is attached to the nozzle unit 60 such that the nozzle 61 moves in the left-right direction together with the nozzle unit 60, and further, a photo-interrupter 62 having a light-emitting section and a light-receiving section not shown in the drawing is provided such that the photo-interrupter 62 moves together with the nozzle unit 60. The nozzle unit 60 moves in the left-right direction such that the slit plate 71 is sandwiched between the light-emitting section and the light-receiving section of the photo-interrupter 62. Further, a reference photo-interrupter 75 having a light-emitting section and a light-receiving section is attached to the support 70 similarly to the photo-interrupter 62 such that a light-shielding plate provided in the nozzle unit 60 passes between the light-emitting section and the light-receiving section. As shown in FIG. 2, when the light-shielding plate is at a position where the light of the reference photo-interrupter 75 is blocked, the controller recognizes that the nozzle unit 60 to which the light-shielding plate is attached is at an initial position, and also recognizes that the photo-interrupter 62 attached to the nozzle unit 60 is at the initial position, and that the nozzle 61 is at the initial position 90. When pulses are applied to the pulse motor 50 in this state, the pulse motor 50 rotates the drive belt in a predetermined amount of rotation for every pulse, causing the nozzle 61 of the nozzle unit 60 to move toward a sample collection position 95 (see FIG. 8) shown in the right side of the drawing, for a predetermined distance corresponding to the predetermined amount of rotation, and thereby the nozzle 61 moves to the sample collection position 95.

Figure 4:
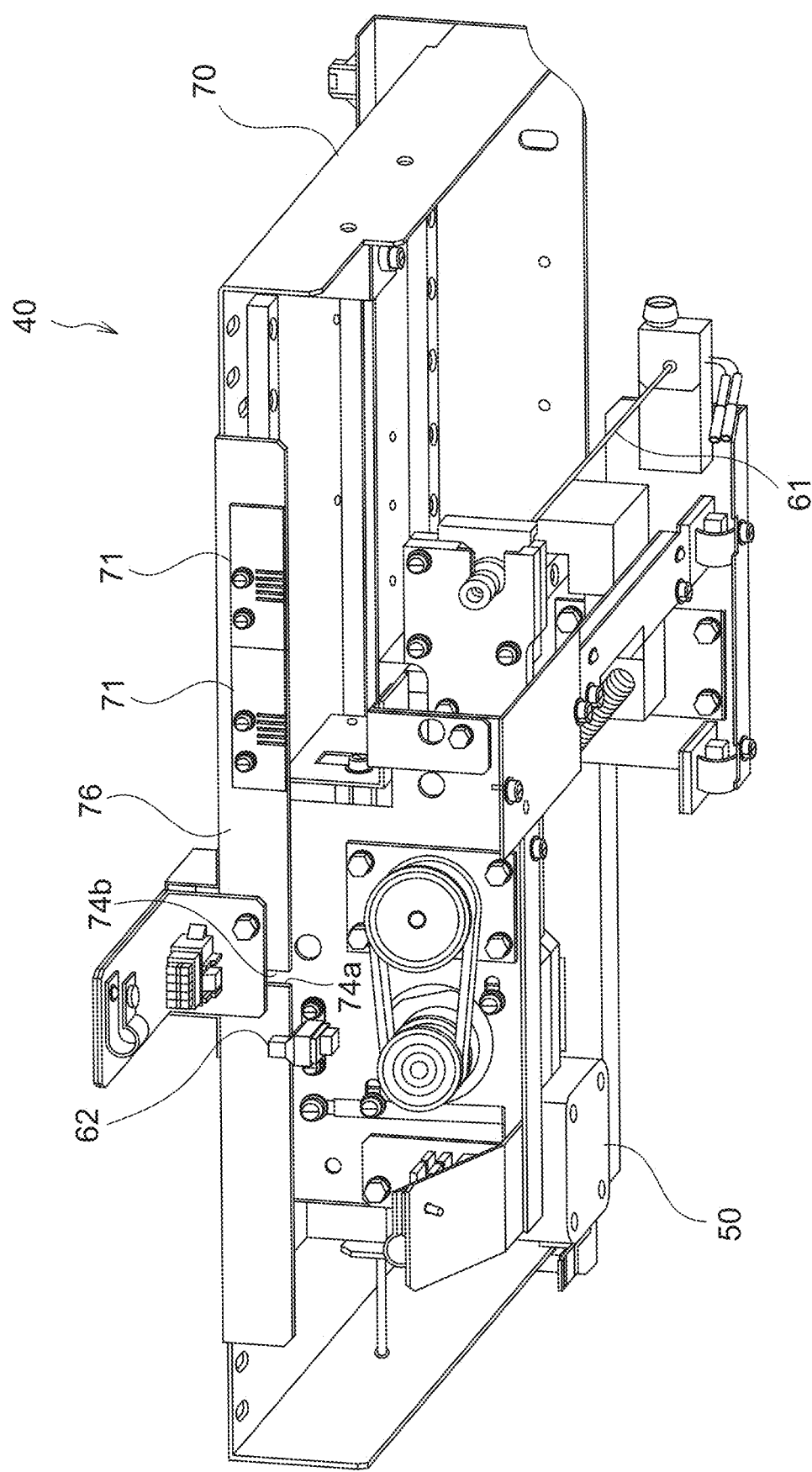
FIG. 4 is a top perspective view of the external appearance of a sample collection apparatus.
Figure 5:
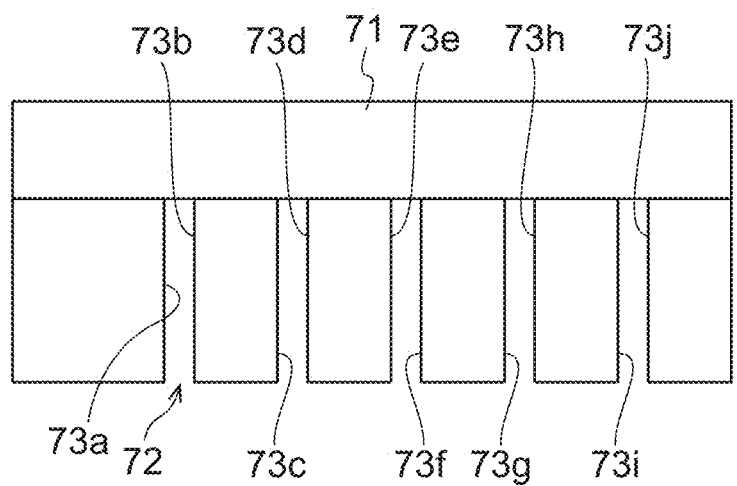
FIG. 5 is a schematic plan view illustrating a magnified image of the shape of a slit plate.

FIG. 4 is a top perspective view of an external appearance of the sample collection apparatus 40. The slit plate 71 is attached to the top plate 76 of the support 70 as described above. As shown in a magnified schematic plan view of FIG. 5, in the slit plate 71, slits 72 are formed as a plurality of notches (five notches, in this embodiment) to form a comb-like external appearance. The slits 72 are arranged in order along the direction of the movement of the photo-interrupter 62 of the nozzle unit 60. Further, both sides of each slit 72 constitute edges. In this embodiment, a 1st edge 73a, a 2nd edge 73b, a 3rd edge 73c, a 4th edge 73d, a 5th edge 73e, a 6th edge 73f, a 7th edge 73g, an 8th edge 73h, a 9th edge 73i, and a 10th edge 73j are present from the initial-position side (the left side of the drawing). When the photo-interrupter 62, while passing through the slit plate 71, passes through a portion without a slit 72, the photo-interrupter 62 is in a light-shielded state in which the light is blocked between the light-emitting section and the light-receiving section. On the other hand, when the photo-interrupter 62 passes through a slit 72, the photo-interrupter 62 is in a light-receiving state in which the light-receiving section receives light from the light-emitting section. In the photo-interrupter 62 of this embodiment, the signal is "ON" when it is in the light-shielded state, and the signal is "OFF" when it is in the light-receiving state. In the top plate 76, another slit is formed on the left side of the slit plate 71. The left side of this slit is a 1st sub-edge 74a, and the right side of the slit is a 2nd sub-edge 74b.

As shown in the hardware configuration in FIG. 3, the controller 100 includes a CPU (Central Processing Unit) 110, a ROM (Read Only Memory) 120, a RAM (Random Access Memory) 130, and a storage device 150. The components are communicatively coupled to each other through a bus 190.

The CPU 110 is a central processing unit that executes various programs and controls each section. Thus, the CPU 110 reads a program from the ROM 120 or the storage device 150, and uses the RAM 130 as a workspace to execute the program. The CPU 110 controls each component according to a program stored in the ROM 120 or the storage device 150.

The ROM 120 stores various programs and data. The RAM 130 functions as a workspace that temporarily stores a program or data. The storage device 150 is configured as a storage device based on an HDD (Hard Disk Drive), an SSD (Solid State Drive), or a flash memory, and stores programs including an operating system, and data. In the first embodiment, the ROM 120 or the storage device 150 stores programs and various data related to control and judgment.

In the hardware configuration of the controller 100, the CPU 110 executes the programs to control the pulse motor 50 and the photo-interrupter 62. The storage device 150 also stores data for carrying out this control, more specifically, data related to the predetermined pulse number and the reference signal.

Figure 6:
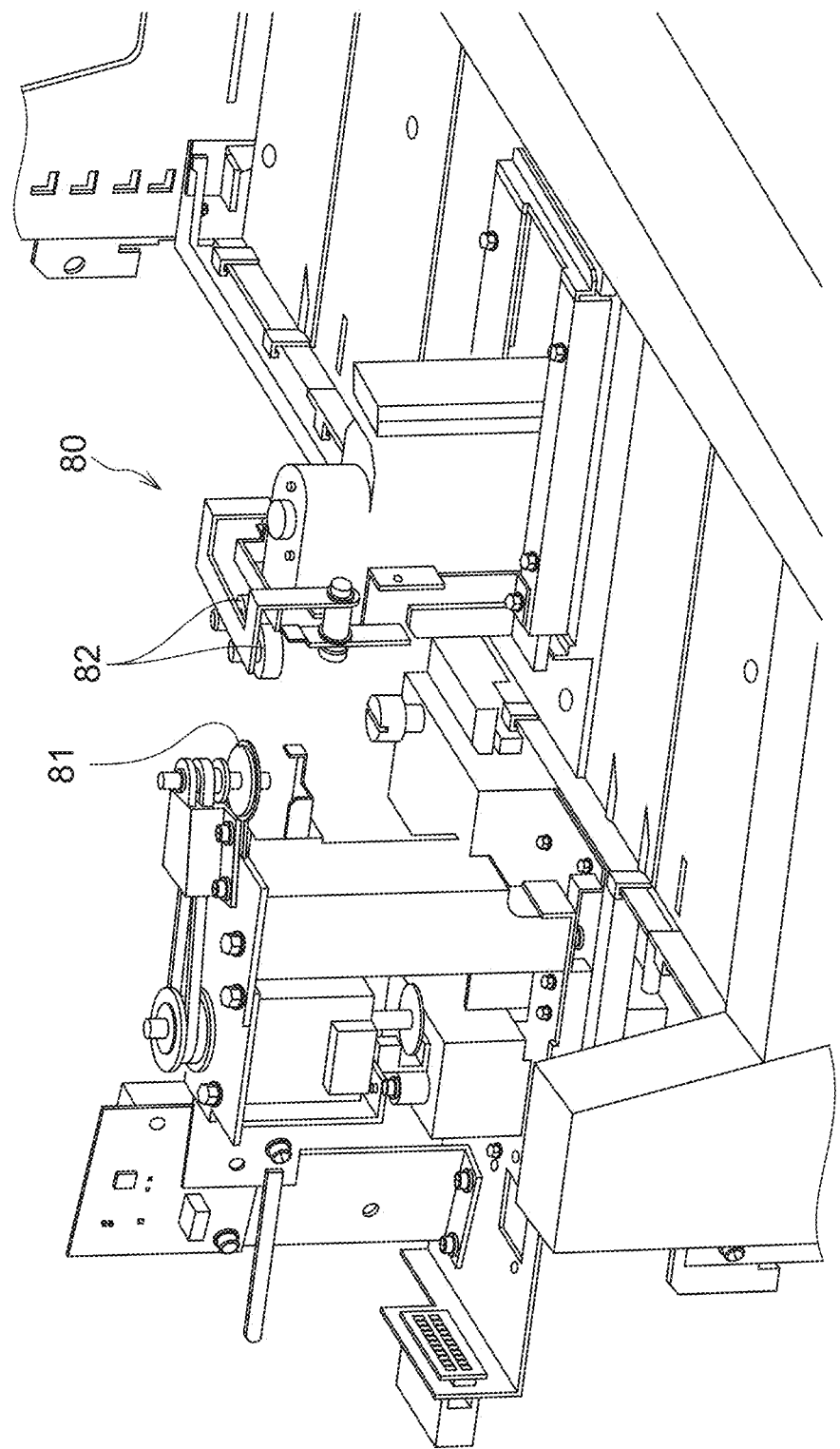
FIG. 6 is a front perspective view of the external appearance of a holding member.

FIG. 6 is a front perspective view of an external appearance of a holding member 80. The holding member 80 is provided with a driving roller 81 capable of rotary driving by itself, and a driven roller 82 that rotates in accordance with the rotary driving of the driving roller 81. In a state in which a sample tube 11 is sandwiched between the driving roller 81 and the driven roller 82 as shown in a schematic plan view in FIG. 7, a sample can be collected by the nozzle 61 through a collection range 11B of an insertion opening 11A. The diameter of the collection range 11B is w.

Figure 7:
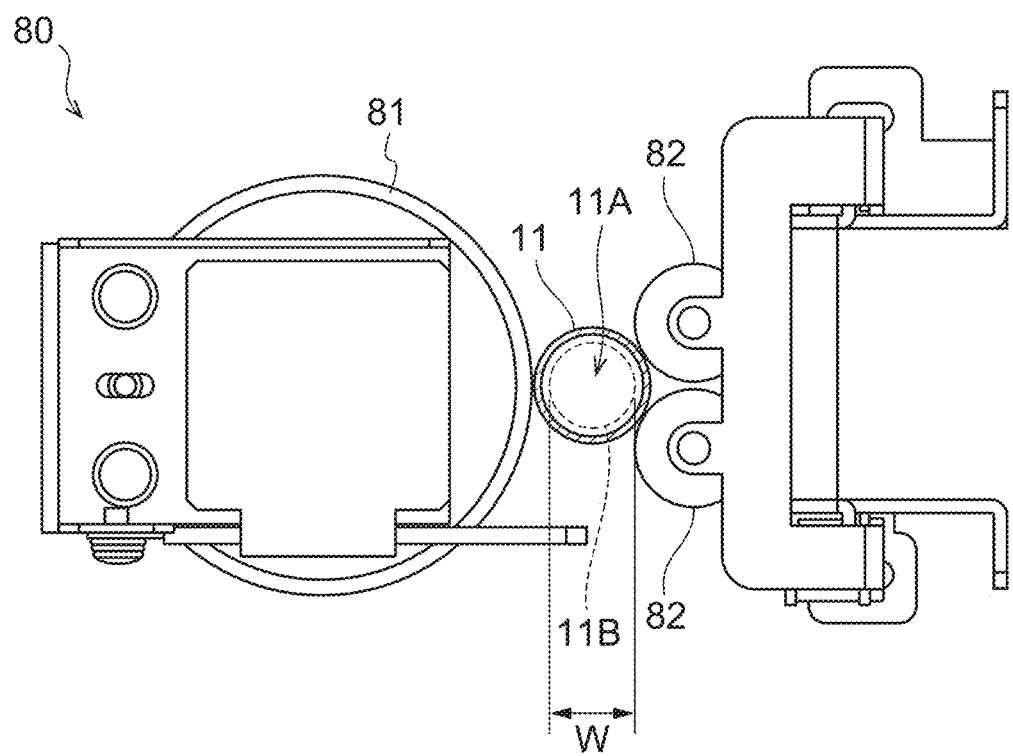
FIG. 7 is a schematic plan view illustrating the positional relationship between a holding member and a sample tube.
Figure 8:
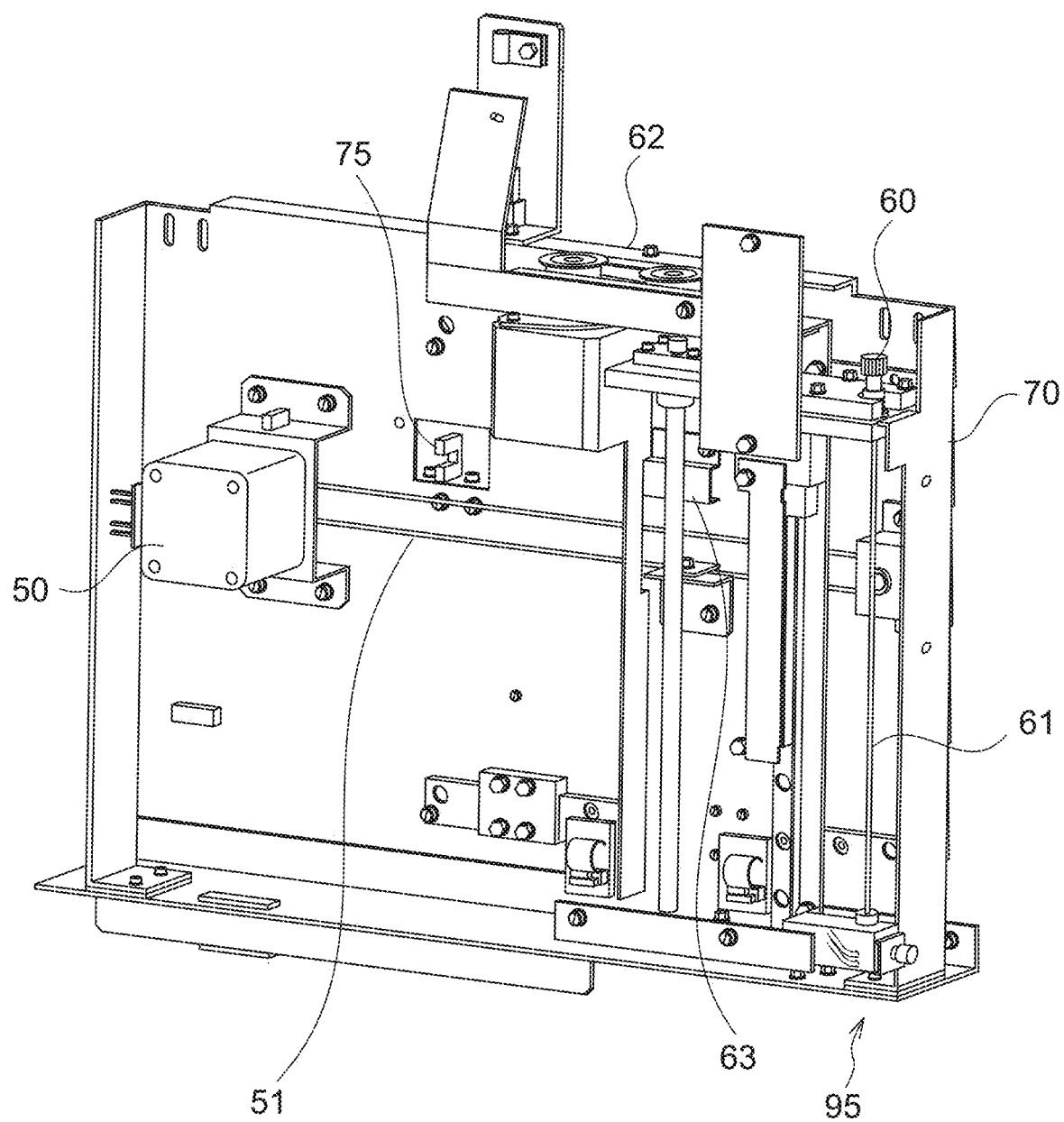
FIG. 8 is a front perspective view of a sample collection apparatus in a state in which a nozzle is at a collection position.

A front perspective view in FIG. 8 illustrates a state in which the nozzle unit 60 has moved rightward from the initial position 90 shown in FIG. 2 to reach the sample collection position 95. In this state, the nozzle 61 can be inserted into the sample tube 11 from the collection range 11B shown in FIG. 7.

Figure 9:
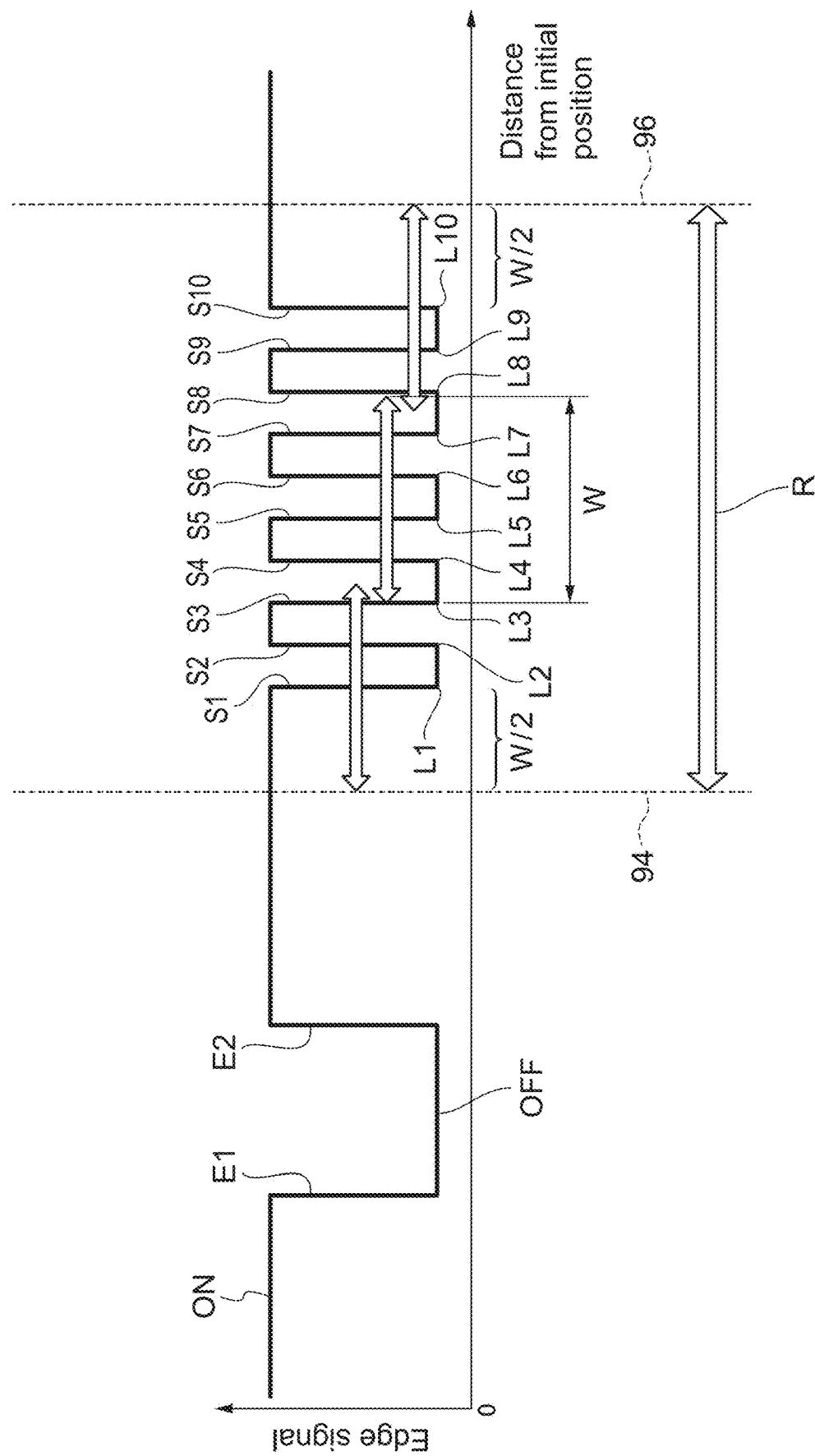
FIG. 9 is a schematic diagram illustrating the relationship between edge signals and a placement range of a holding member in a first embodiment.

FIG. 9 schematically illustrates relationship between the edge signals and a placement range R of the holding member 80. In a graph of FIG. 9, the abscissa represents the distance of the nozzle unit 60 (more specifically, nozzle 61) from the initial position 90, and the ordinate represents the "ON" state and the "OFF" state of the edge signals.

Application of a pulse to the pulse motor 50 causes the nozzle unit 60 to start moving from the initial position 90. In the beginning of the movement, the light-shielded state of the photo-interrupter 62 is maintained to keep the "ON" state of the signal. When the 1st sub-edge 74a (see FIG. 4) is recognized, a 1st sub-signal E1 is generated, and the photo-interrupter 62 turns into the light-receiving state, causing the signal to turn into the "OFF" state. Immediately thereafter, the 2nd sub-edge 74b (see FIG. 4) is recognized, and a 2nd sub-signal E2 is generated as a result, causing the signal to turn into the "ON" state again.

After the photo-interrupter 62 reaches the slit plate 71, the signal turns into the "OFF" state at a 1st position L1 where the 1st edge 73a (see FIG. 5) is recognized resulting in generation of a 1st signal S1; the signal turns into the "ON" state at a 2nd position L2 where the 2nd edge 73b (see FIG. 5) is recognized resulting in generation of a 2nd signal S2; the signal turns into the "OFF" state at a 3rd position L3 where the 3rd edge 73c (see FIG. 5) is recognized resulting in generation of a 3rd signal S3; the signal turns into the "ON" state at a 4th position L4 where the 4th edge 73d (see FIG. 5) is recognized resulting in generation of a 4th signal S4; the signal turns into the "OFF" state at a 5th position L5 where the 5th edge 73e (see FIG. 5) is recognized resulting in generation of a 5th signal S5; the signal turns into the "ON" state at a 6th position L6 where the 6th edge 73f (see FIG. 5) is recognized resulting in generation of a 6th signal S6; the signal turns into the "OFF" state at a 7th position L7 where the 7th edge 73g (see FIG. 5) is recognized resulting in generation of a 7th signal S7; the signal turns into the "ON" state at an 8th position L8 where the 8th edge 73h (see FIG. 5) is recognized resulting in generation of an 8th signal S8; the signal turns into the "OFF" state at a 9th position L9 where the 9th edge 73i (see FIG. 5) is recognized resulting in generation of a 9th signal S9; the signal turns into the "ON" state at a 10th position L10 where the 10th edge 73j (see FIG. 5) is recognized resulting in generation of a 10th signal S10; and this state is maintained thereafter.

In other words, the position of the nozzle at the time when the photo-interrupter 62 recognizes the 1st edge 73a to generate the 1st signal S1 is the 1st position L1; the position of the nozzle at the time when the photo-interrupter 62 recognizes the 2nd edge 73b to generate the 2nd signal S2 is the 2nd position L2; the position of the nozzle at the time when the photo-interrupter 62 recognizes the 3rd edge 73c to generate the 3rd signal S3 is the 3rd position L3; the position of the nozzle at the time when the photo-interrupter 62 recognizes the 4th edge 73d to generate the 4th signal S4 is the 4th position L4; the position of the nozzle at the time when the photo-interrupter 62 recognizes the 5th edge 73e to generate the 5th signal S5 is the 5th position L5; the position of the nozzle at the time when the photo-interrupter 62 recognizes the 6th edge 73f to generate the 6th signal S6 is the 6th position L6; the position of the nozzle at the time when the photo-interrupter 62 recognizes the 7th edge 73g to generate the 7th signal S7 is the 7th position L7; the position of the nozzle at the time when the photo-interrupter 62 recognizes the 8th edge 73h to generate the 8th signal S8 is the 8th position L8; the position of the nozzle at the time when the photo-interrupter 62 recognizes the 9th edge 73i to generate the 9th signal S9 is the 9th position L9; and the position of the nozzle at the time when the photo-interrupter 62 recognizes the 10th edge 73j to generate the 10th signal S10 is the 10th position L10.

Note that the distance between the 1st position L1 and the 2nd position L2, the distance between the 2nd position L2 and the 3rd position L3, the distance between the 3rd position L3 and the 4th position L4, the distance between the 4th position L4 and the 5th position L5, the distance between the 5th position L5 and the 6th position L6, the distance between the 6th position L6 and the 7th position L7, the distance between the 7th position L7 and the 8th position L8, the distance between the 8th position L8 and the 9th position L9, and the distance between the 9th position L9 and the 10th position L10 may be either the same as or different from each other as long as each distance is shorter than w/2. Further, the distance between the position where the 2nd sub-signal E2 is generated and the 1st position L1 is not less than w. Note that, in cases in which the distance between the 1st position L1 and the 2nd position L2, the distance between the 2nd position L2 and the 3rd position L3, the distance between the 3rd position L3 and the 4th position L4, the distance between the 4th position L4 and the 5th position L5, the distance between the 5th position L5 and the 6th position L6, the distance between the 6th position L6 and the 7th position L7, the distance between the 7th position L7 and the 8th position L8, the distance between the 8th position L8 and the 9th position L9, and the distance between the 9th position L9 and the 10th position L10 are not less than w/2, the distances can be reduced to less than w/2 by replacing the slit plate with a slit plate having shorter edge intervals of the slits.

In a case in which a center of the collection range 11B is positioned at the 1st position L1, a left end of the collection range 11B, in other words, a position at a distance of w/2 from the 1st position L1 toward the initial-position side, is defined as a lower-limit position 94. Further, in a case in which the center of the collection range 11B is positioned at the 10th position L10, a right end of the collection range 11B, in other words, a position at a distance of w/2 from the 10th position L10 toward the side opposite from the initial position, is defined as an upper-limit position 96. Then, the range between the lower-limit position 94 and the upper-limit position 96 is the placement range R of the holding member 80. By placing the holding member 80 such that the collection range 11B is positioned within the placement range R (in other words, at a position where the collection range 11B covers neither the lower-limit position 94 nor the upper-limit position 96), the collection range 11B of the sample tube 11 placed on the holding member 80 can be positioned under at least two positions next to each other among the 1st position L1 to the 10th position L10, and the center of the collection range 11B can be placed between these two positions as a result. Therefore, one of the 1st signal S1 to the 9th signal S9 is inevitably sent to the controller 100 from the photo-interrupter 62 immediately before the time point when the nozzle 61 reaches the center of the collection range 11B.

Figure 10:
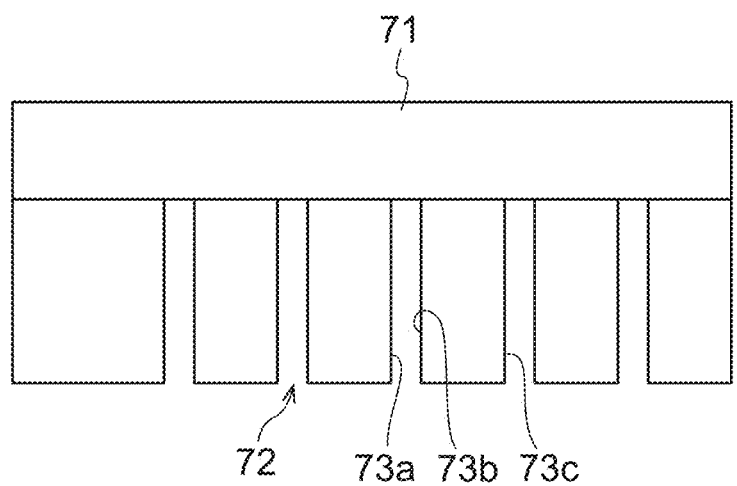
FIG. 10 is a schematic plan view illustrating the shape of a slit plate.

Note that a second embodiment uses the same slit plate 71 as in the first embodiment. As illustrated in a schematic plan view of FIG. 10, the fifth edge is defined as a 1st edge 73a; the sixth edge is defined as a 2nd edge 73b; and the seventh edge is defined as a 3rd edge 73c.

Figure 11:
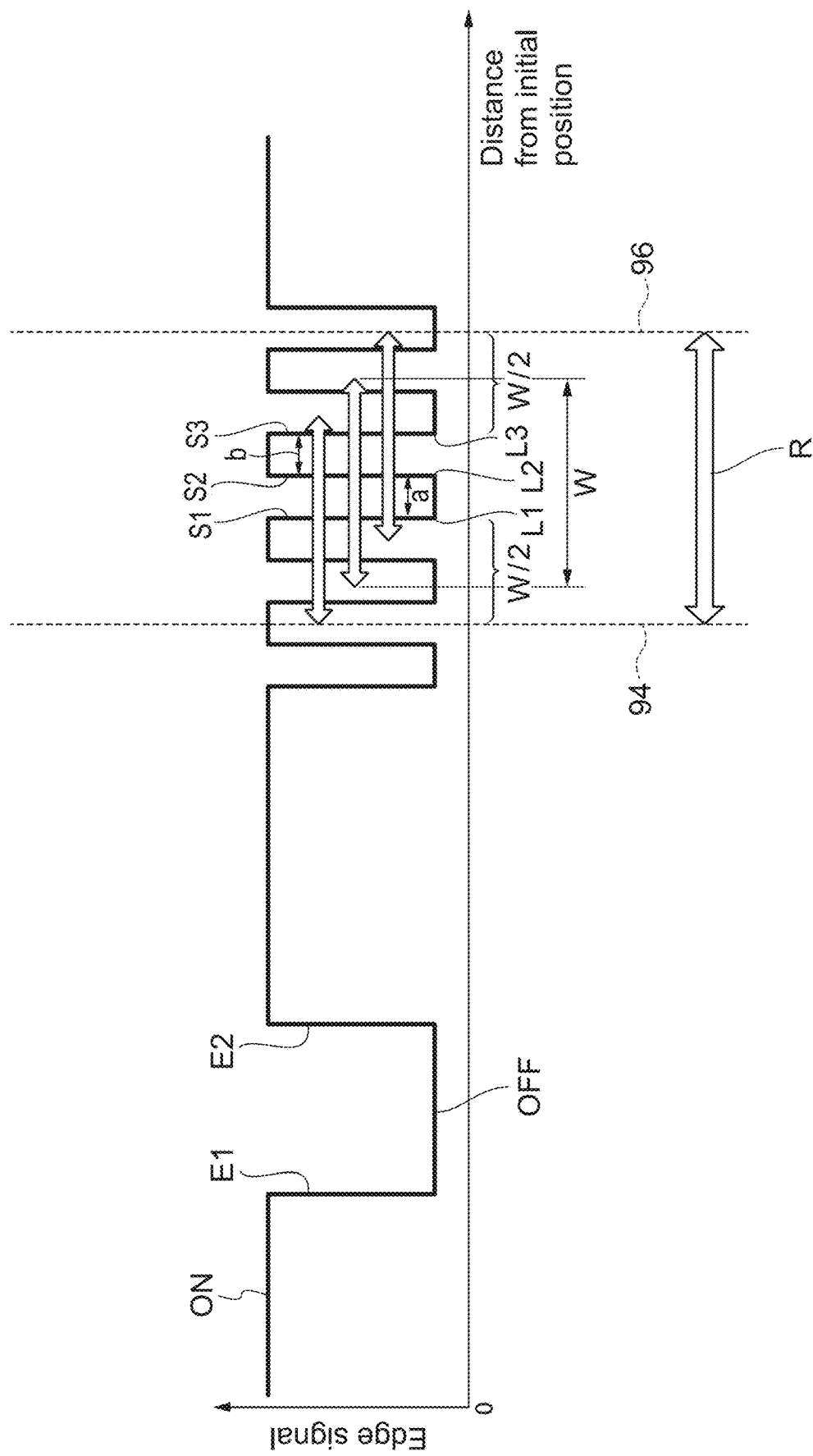
FIG. 11 is a schematic diagram illustrating the relationship between edge signals and a placement range of a holding member in a second embodiment.

As shown in FIG. 11, the "ON" state and the "OFF" state of the signal according to the photo-interrupter 62 are repeated similarly to the first embodiment, wherein the signal turns into the "OFF" state at a 1st position L1 where the 1st edge 73a (see FIG. 10) is recognized by the photo-interrupter 62 resulting in generation of a 1st signal S1; the signal turns into the "ON" state at a 2nd position L2 where the 2nd edge 73b (see FIG. 10) is recognized resulting in generation of a 2nd signal S2; the signal turns into the "OFF" state at a 3rd position L3 where the 3rd edge 73c (see FIG. 10) is recognized resulting in generation of a 3rd signal S3; and thereafter, again, the "ON" state and the "OFF" state of the signal according to the photo-interrupter 62 are repeated similarly to the first embodiment.

Note that the distance "a" between the 1st position L1 and the 2nd position L2, and the distance "b" between the 2nd position L2 and the 3rd position L3, may be the same as or different from each other as long as each distance is shorter than w/2.

In a case in which the center of the collection range 11B is positioned at the 1st position L1, the left end of the collection range 11B, in other words, the position at a distance of w/2 from the 1st position L1 toward the initial-position side, is defined as a lower-limit position 94. Further, in a case in which the center of the collection range 11B is positioned at the 3rd position L3, the right end of the collection range 11B, in other words, the position at a distance of w/2 from the 3rd position L3 toward the side opposite from the initial position, is defined as an upper-limit position 96. Then, the range between the lower-limit position 94 and the upper-limit position 96 is a placement range R of the holding member 80. The placement range R in this embodiment is narrower than the placement range R in the first embodiment. By placing the holding member 80 such that the collection range 11B is positioned within the placement range R (in other words, at a position where the collection range 11B covers neither the lower-limit position 94 nor the upper-limit position 96), the collection range 11B of the sample tube 11 placed on the holding member 80 can be positioned under at least two positions next to each other among the 1st position L1 to the 3rd position L3, and the center of the collection range 11B can be placed between these two positions as a result. Therefore, one of the 1st signal S1 or the 2nd signal S2 is inevitably sent to the controller 100 from the photo-interrupter 62 immediately before the time point when the nozzle 61 reaches the center of the collection range 11B.

In both embodiments mentioned above, the placement range R may be displayed on the housing 3 or the support 70. An operator may place the holding member 80 such that the collection range 11B of the sample tube 11 is set in an arbitrary position within the placement range R.

Figure 12:
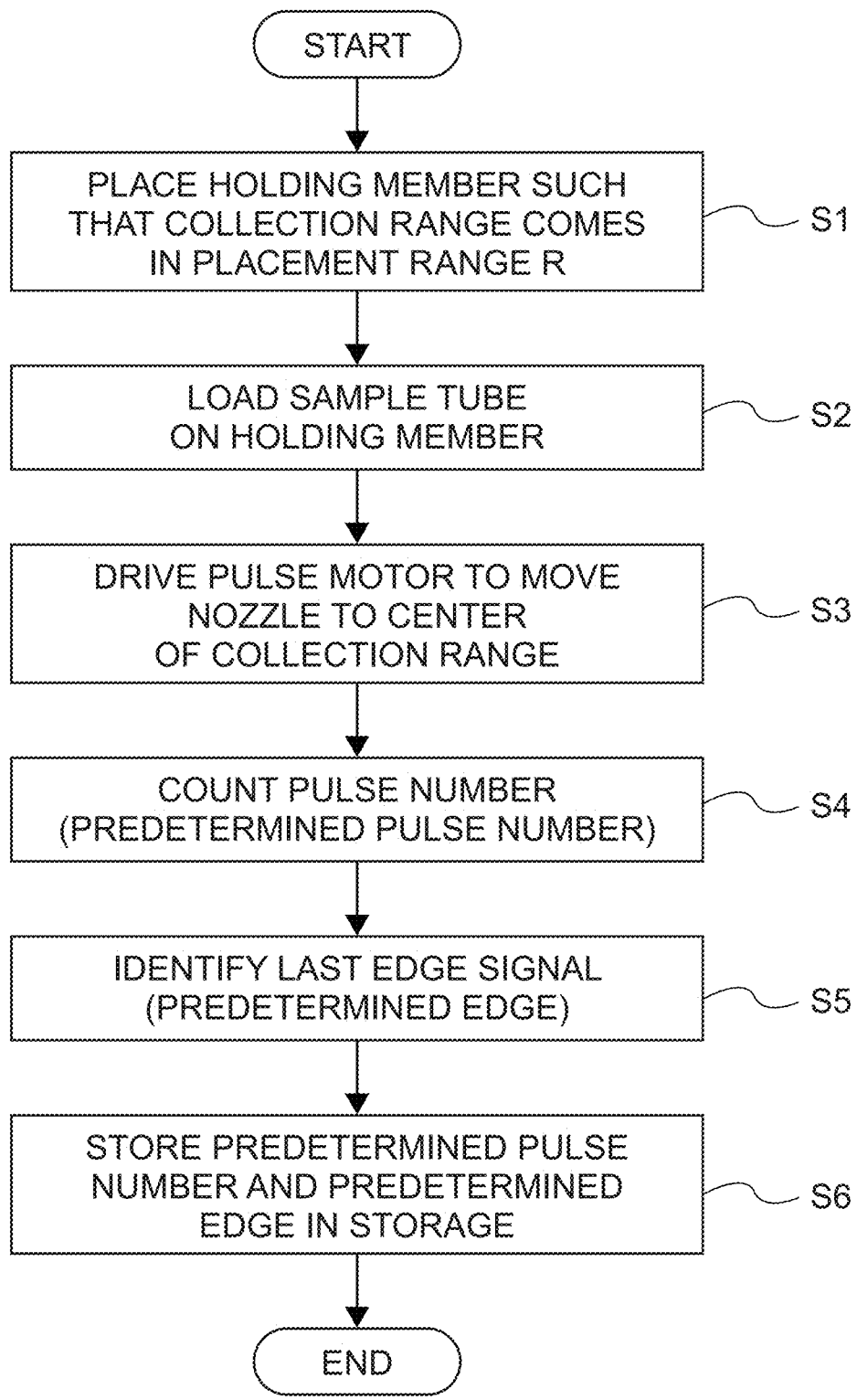
FIG. 12 is a flow chart illustrating the methods of producing a sample collection apparatus of the first embodiment and the second embodiment.

The methods of producing the sample collection apparatuses 40 of the first embodiment and the second embodiment are described with reference to a flow chart of FIG. 12.

First, in a step shown in S1, the holding member 80 is attached to the support 70 such that the collection range 11B is included within the placement range R (see FIG. 9 and FIG. 11).

Subsequently, in a step shown in S2, the sample tube 11 is loaded on the holding member 80 as shown in FIG. 7. When the signal received by the reference photo-interrupter 75 is in the "ON" state (that is, when the nozzle unit 60 is at the initial position), the process proceeds to a step shown in S3. In this step, while the photo-interrupter 62 is operated, pulses are applied to the pulse motor 50 to move the nozzle unit 60 toward the sample collection position 95, and the movement is stopped at the time when the nozzle 61 reaches the center of the collection range 11B. Note that, when the nozzle unit 60 (more specifically, the nozzle 61) is not at the initial position (when the signal of the reference photo-interrupter 75 is in the "OFF" state), a step of rotating the pulse motor 50 until the signal received by the reference photo-interrupter 75 turns "ON" (that is, until the nozzle unit 60 and the nozzle 61 reach the initial position) is carried out before S2.

Subsequently, in a step shown in S4, the number of pulses that have been applied to the pulse motor 50 before this time point is counted to determine the predetermined pulse. In other words, the number of pulses required for the nozzle 61 to move from the initial position 90 to the center of the collection range 11B is determined as a predetermined pulse number. Simultaneously, in a step shown in S5, the last edge signal recognized by the photo-interrupter 62 is identified to determine a predetermined edge. In the case of the first embodiment, the predetermined edge is one of the 1st signal S1 to the 9th signal S9. In the case of the second embodiment, the predetermined edge is one of the 1st signal or the 2nd signal. More specifically, the number of edge signals detected by the photo-interrupter 62 (in other words, the number of edges detected by the photo-interrupter) before the nozzle 61 reaches the center of the collection range 11B from the initial position may be the predetermined edge. Note that, in cases in which the intervals between the positions assigned with the edge signals are sufficiently less than the diameter w of the collection range 11B, the number before or after the number of signals detected by the photo-interrupter 62 may also be the predetermined edge.

Then, in a step shown in S6, the predetermined pulse number determined in the step shown in S4 and the predetermined edge identified in the step shown in S5 are stored in the storage device 150, thereby completing the sample collection apparatus 40.

Figure 13:
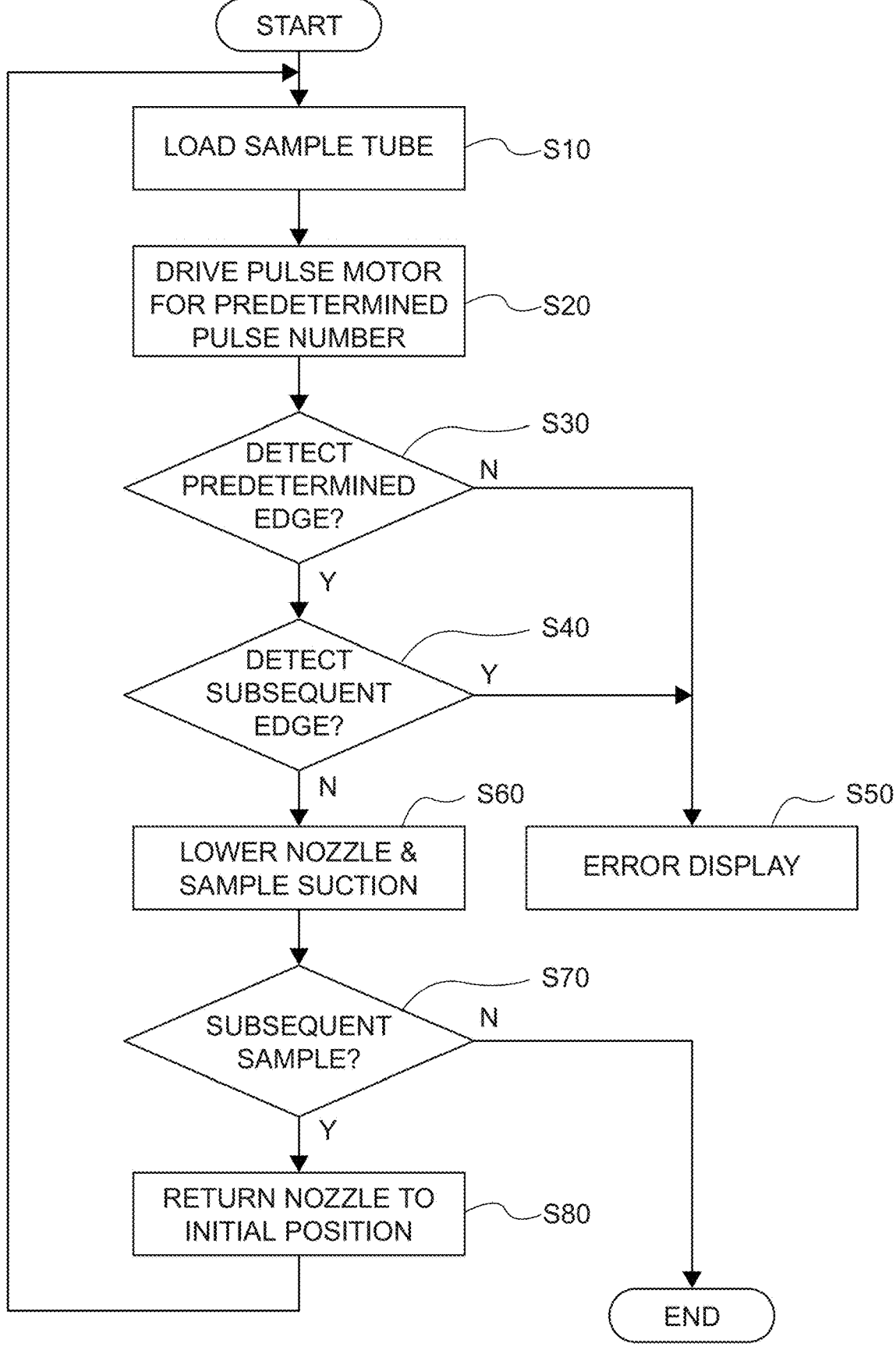
FIG. 13 is a flow chart illustrating a control example of a sample collection apparatus.

An example of control of the sample collection apparatus 40 is described with reference to a flow chart of FIG. 13.

First, in a step shown in S10, the sample tube 11 storing a liquid sample is loaded on the holding member 80.

Then, in a step shown in S20, when the signal received by the reference photo-interrupter 75 is in the "ON" state (that is, when the nozzle unit 60 and the nozzle 61 are at the initial position), the controller 100 operates the photo-interrupter 65, and applies pulses in the predetermined pulse number stored in the storage device 150 to the pulse motor 50, to move the nozzle unit 60 (more specifically, the nozzle 61) toward the sample collection position 95, followed by stopping the movement at the position. Note that, when the nozzle unit 60 and the nozzle 61 are not at the initial position (that is, when the signal of the reference photo-interrupter 75 is in the "OFF" state), a step of rotating the pulse motor 50 until the signal received by the reference photo-interrupter 75 turns "ON" (that is, until the nozzle unit 60 and the nozzle 61 reach the initial position) is carried out before the step shown in S20.

Subsequently, in a step shown in S30, at the time when the nozzle unit 60 is stopped, the controller 100 judges whether or not the predetermined edge stored in the storage device 150 is detected. Here, in a case in which the predetermined edge is defined in the step shown in S4 as the number of edge signals detected by the photo-interrupter 62, the number of edge signals counted in the step shown in S4 and the number of edge signals counted in the step shown in S20 are compared. In a case in which the number of edge signals counted in the step shown in S20 is the number of edge signals counted in S4 or more, the predetermined edge is judged to have been detected. On the other hand, in a case in which the number of edge signals counted in the step shown in S20 is less than the number of edge signals counted in S4, the predetermined edge is judged not to have been detected.

In a case in which, in a step shown in S30, the predetermined edge is judged to have been detected, the process proceeds to a step shown in S40, in which whether or not the edge subsequent to the predetermined edge has been detected is judged by the controller 100. In a case in which the predetermined edge is defined in the step shown in S4 as the number of edge signals detected by the photo-interrupter 62, when the number of edge signals counted in the step shown in S20 is the same as the number of edge signals counted in S4, the edge subsequent to the predetermined edge is judged not to have been detected. On the other hand, in a case in which the number of edge signals counted in the step shown in S20 is larger than the number of edge signals counted in the step shown in S4, the edge subsequent to the predetermined edge is judged to have been detected.

In a case in which, in the step shown in S30, the predetermined edge is judged not to have been detected, and in a case in which, in the step shown in S40, the edge subsequent to the predetermined edge is judged to have been detected, there may be a certain problem. In such a case, when the nozzle 61 is lowered at the position, there is a concern of disorder by the nozzle 61 not coming into contact with the collection range 11B. In any of such cases, the process proceeds to a step shown in S50, wherein an error message is displayed using an appropriate means (for example, the display panel 31 shown in FIG. 1), and the sample is not aspirated by the nozzle 61.

On the other hand, in a case in which, in the step shown in S40, the edge subsequent to the predetermined edge is judged not to have been detected, the nozzle 61 is judged to be positioned near the center of the collection range 11B, and the process proceeds to a step shown in S60, wherein the nozzle 61 is lowered by the nozzle unit 60, resulting in insertion of the tip of the nozzle 61 into the sample tube 11, followed by aspiration of the sample. The aspirated sample is subjected to analysis by the HPLC apparatus X.

After the completion of the analysis of the sample, the process proceeds to a step shown in S70, wherein whether or not there is a subsequent sample is judged. In a case in which there is no subsequent sample, the control is terminated. In a case in which there is a subsequent sample, the process proceeds to a step shown in S80, wherein the pulse motor 50 is counterrotated to move the nozzle unit 60 to the initial position 90. Then, at the time point when the light of the reference photo-interrupter 75 is blocked by a light-shielding plate 63, the nozzle unit 60 is judged to have reached the initial position 90, and the movement is stopped. Thereafter, a necessary process such as washing of the nozzle 61 is carried out, and the control starts again from the step shown in S10.

Note that the production method of the above embodiment may be as follows. Namely, in the step shown in S4, the number of pulses applied to the pulse motor 50, required to obtain the last edge signal recognized by the photo-interrupter 62, is also counted. Further, in the step shown in S5, the number of pulses applied is defined as the reference pulse number. Moreover, in the step shown in S6, the reference pulse number is stored in the storage device 150 together with the predetermined edge and the predetermined pulse. Then, in a case in which, in the step shown in S40, the subsequent edge is judged not to have been detected, the next step judges whether or not the number of pulses applied to the pulse motor 50, required to obtain the last edge signal recognized by the photo-interrupter 62, is the same as the reference pulse number or within a predetermined acceptable range. Then, in a case in which the number of pulses applied is the same as the reference pulse number or within the predetermined acceptable range, the process may proceed to the step shown in S60 to lower the nozzle. As a result, a sample collection apparatus capable of more securely moving a nozzle to a predetermined position of a sample tube can be produced.

INDUSTRIAL APPLICABILITY

The invention is applicable to the production of an apparatus such as an HPLC apparatus having a mechanism for collecting a sample using a nozzle.

What is claimed is:

1. A method of producing a sample collection apparatus, the apparatus comprising:
   a support provided with a pulse motor, and with a nozzle unit that is driven by the pulse motor to cause horizontal movement of a nozzle from an initial position to a sample collection position;
   a slit plate which functions as a guide for the movement of the nozzle unit and in which slits provided with N continuous edges, wherein N is an integer of 3 or higher, are formed;
   a photo-interrupter that moves in conjunction with the nozzle unit to recognize the slits;
   a holding member configured to hold, under the sample collection position, a sample tube which stores a sample, and in which an insertion opening for insertion of the nozzle is formed;
   a controller configured to control the pulse motor and the photo-interrupter; and
   a storage device for storing data for carrying out control;
   wherein in a case in which
   a diameter of a collection range that is a range in which the nozzle can be inserted into the insertion opening is defined as w,
   an edge closest to the initial position among the N continuous edges is defined as a 1st edge, and an edge most distant from the initial position is defined as an Nth edge,
   signals sent to the controller in a case in which the photo-interrupter recognizes the 1st edge to the Nth edge are defined as a 1st signal to an Nth signal, respectively,
   positions of the nozzle at which the photo-interrupter recognizes the 1st edge to the Nth edge are defined as a 1st position to an Nth position, respectively,
   all distances between positions next to each other among the 1st position to the Nth position are less than w/2,
   a position at a distance of w/2 from the 1st position toward an initial-position side is defined as a lower-limit position, and
   a position at a distance of w/2 from the Nth position toward a side opposite from the initial position is defined as an upper-limit position,
   the method comprises the steps of:
   attaching the holding member to the support such that the collection range is included within a range from the lower-limit position to the upper-limit position;
   loading the sample tube on the holding member;
   counting a number of pulses with which the pulse motor is driven to move the nozzle to a center of the collection range of the sample tube;
   identifying, among the 1st signal to the Nth signal, a last signal recognized by the photo-interrupter before the nozzle reaches the center of the collection range; and
   storing the number of pulses and the last signal in the storage device.

2. A method of producing a sample collection apparatus, the apparatus comprising:
   a support provided with a pulse motor, and with a nozzle unit that is driven by the pulse motor to cause horizontal movement of a nozzle from an initial position to a sample collection position;
   a slit plate which functions as a guide for the movement of the nozzle unit and in which slits provided with at least three continuous edges are formed;
   a photo-interrupter that moves in conjunction with the nozzle unit to recognize the slits;
   a holding member configured to hold, under the sample collection position, a sample tube which stores a sample, and in which an insertion opening for insertion of the nozzle is formed;
   a controller configured to control the pulse motor and the photo-interrupter; and
   a storage device for storing data for carrying out control;
   wherein in a case in which
   a diameter of a collection range that is a range in which the nozzle can be inserted into the insertion opening is defined as w,
   the three continuous edges are defined, from a side closer to the initial position, as a 1st edge, a 2nd edge, and a 3rd edge,
   signals sent to the controller in a case in which the photo-interrupter recognizes the 1st edge, the 2nd edge, and the 3rd edge are defined as a 1st signal, a 2nd signal, and a 3rd signal, respectively, positions of the nozzle at which the photo-interrupter recognizes the 1st edge, the 2nd edge, and the 3rd edge are defined as a 1st position, a 2nd position, and a 3rd position, respectively, a distance a from the 1st position to the 2nd position is less than w/2, a distance b from the 2nd position to the 3rd position is less than w/2, a position at a distance of w/2 from the 1st position toward an initial-position side is a lower-limit position, and a position at a distance of w/2 from the 3rd position toward a side opposite from the initial position is an upper-limit position, the method comprises the steps of:

attaching the holding member to the support such that the collection range is included within a range from the lower-limit position to the upper-limit position;

loading the sample tube on the holding member;

counting a number of pulses with which the pulse motor is driven to move the nozzle to a center of the collection range of the sample tube;

identifying, among the 1st signal, the 2nd signal, and the 3rd signal, a last signal recognized by the photo-interrupter before the nozzle reaches the center of the collection range; and storing the number of pulses and the last signal in the storage device.

3. The method of producing a sample collection apparatus according to claim 2, wherein the distance a is equal to the distance b.

4. The method of producing a sample collection apparatus according to claim 1, wherein identifying the last signal includes identifying the last signal by identifying a number of edges recognized by the photo-interrupter before the nozzle reaches the center of the collection range from the initial position.

5. The method of producing a sample collection apparatus according to claim 2, wherein identifying the last signal includes identifying the last signal by identifying a number of edges recognized by the photo-interrupter before the nozzle reaches the center of the collection range from the initial position.

6. The method of producing a sample collection apparatus according to claim 3, wherein identifying the last signal includes identifying the last signal by identifying a number of edges recognized by the photo-interrupter before the nozzle reaches the center of the collection range from the initial position.

* * * * *